(12) United States Patent
Lind

(10) Patent No.: US 12,244,224 B2
(45) Date of Patent: *Mar. 4, 2025

(54) NONLINEAR, DISCRETE TIME CONTROL OF POWER FACTOR CORRECTION POWER CONVERTER

(71) Applicant: SEMICONDUCTOR COMPONENTS INDUSTRIES, LLC, Scottsdale, AZ (US)

(72) Inventor: Anders Lind, San Juan Capistrano, CA (US)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/645,718

(22) Filed: Apr. 25, 2024

(65) Prior Publication Data

US 2024/0380315 A1 Nov. 14, 2024

Related U.S. Application Data

(63) Continuation of application No. 17/524,030, filed on Nov. 11, 2021, now Pat. No. 11,996,768.
(Continued)

(51) Int. Cl.
*H02M 1/42* (2007.01)
*H02M 1/00* (2006.01)
(Continued)

(52) U.S. Cl.
CPC ....... *H02M 1/4225* (2013.01); *H02M 1/0025* (2021.05); *H02M 1/083* (2013.01);
(Continued)

(58) Field of Classification Search
CPC .. H02M 1/0025; H02M 1/0054; H02M 1/083; H02M 1/088; H02M 1/42;
(Continued)

(56) References Cited

U.S. PATENT DOCUMENTS 7,598,715 B1   10/2009  Hariman et al.
7,706,151 B2   4/2010   Neidorff et al.
(Continued)

OTHER PUBLICATIONS

U.S. Appl. No. 17/524,117, "Notice of Allowance", May 12, 2023, 11 pages.
(Continued)

*Primary Examiner* — Thienvu V Tran
*Assistant Examiner* — Shahzeb K Ahmad
(74) *Attorney, Agent, or Firm* — KW Law, LLP

(57) ABSTRACT

An apparatus for controlling a power converter operable to receive a cyclically varying input signal includes a discrete-time, on-time generator coupled to the power converter and configured to regulate an output voltage of the power converter and a controller configured to compare the output voltage of the power converter against a first predetermined range to: obtain a comparison result at a zero-crossing of the cyclically varying input signal and select one of a plurality of operation levels of the discrete-time, on-time generator in response to the comparison result. The plurality of operation levels includes a linear, discrete-time operation level and a nonlinear, discrete-time operation level.

20 Claims, 9 Drawing Sheets

Related U.S. Application Data

(60) Provisional application No. 63/114,088, filed on Nov. 16, 2020.

(51) Int. Cl.
  *H02M 1/08* (2006.01)
  *H02M 3/157* (2006.01)
  *H02M 7/538* (2007.01)
  *H02M 7/5388* (2007.01)

(52) U.S. Cl.
  CPC ......... *H02M 1/4233* (2013.01); *H02M 3/157* (2013.01); *H02M 1/0054* (2021.05); *H02M 7/5388* (2013.01); *Y02B 70/10* (2013.01)

(58) Field of Classification Search
  CPC ............ H02M 1/4208; H02M 1/4225; H02M 1/4233; H02M 1/425; H02M 7/12; H02M 7/125; H02M 7/155; H02M 7/162; H02M 7/1623; H02M 7/217; H02M 7/219; H02M 7/5388; H02M 3/157; Y02B 70/10
  See application file for complete search history.

(56) References Cited

U.S. PATENT DOCUMENTS

| | | | |
|---|---|---|---|
| 8,077,490 B1 | 12/2011 | Prodic et al. | |
| 8,493,049 B2 | 7/2013 | Kwan et al. | |
| 8,670,255 B2 | 3/2014 | Gong et al. | |
| 8,934,273 B2 | 1/2015 | Chalermboon et al. | |
| 10,439,508 B2* | 10/2019 | Adragna | H02M 1/08 |
| 10,720,829 B1* | 7/2020 | Huang | H02M 7/162 |
| 2008/0272756 A1* | 11/2008 | Melanson | H02M 1/4225 323/282 |
| 2011/0317459 A1 | 12/2011 | Kuebrich et al. | |
| 2016/0190912 A1 | 6/2016 | Lim et al. | |
| 2016/0241132 A1 | 8/2016 | Lin et al. | |
| 2018/0054126 A1* | 2/2018 | Lu | H02M 1/14 |
| 2019/0267908 A1* | 8/2019 | Kim | H02M 1/4225 |
| 2019/0319528 A1* | 10/2019 | Matsuura | H02M 1/083 |
| 2020/0112243 A1 | 4/2020 | Dusmez | |
| 2020/0235671 A1* | 7/2020 | Radic | H02M 1/0025 |
| 2021/0305907 A1* | 9/2021 | Dong | H02M 1/083 |

OTHER PUBLICATIONS

U.S. Appl. No. 17/524,064, "Non-Final Office Action", Jun. 14, 2023, 9 pages.
U.S. Appl. No. 17/524,136, "Notice of Allowance", Jun. 22, 2023, 11 pages.
U.S. Appl. No. 17/524,064, "Notice of Allowance", Sep. 27, 2023, 8 pages.
U.S. Appl. No. 17/524,067, "Non-Final Office Action", Aug. 22, 2023, 17 pages.
U.S. Appl. No. 17/524,067, "Notice of Allowance", Mar. 28, 2024, 8 pages.

\* cited by examiner

NONLINEAR, DISCRETE TIME CONTROL OF POWER FACTOR CORRECTION POWER CONVERTER

CROSS-REFERENCES TO RELATED APPLICATIONS

This application claims priority to U.S. Nonprovisional application Ser. No. 17/524,030, filed on Nov. 11, 2021, which claims the benefit of U.S. Provisional Application No. 63/114,088, filed on Nov. 16, 2020, the contents of which are hereby incorporated by reference in their entirety for all purposes.

The following regular U.S. patent applications are incorporated by reference into this application for all purposes:

application Ser. No. 17/524,064, entitled "Method and System for Controlling the Power Factor of a Power Converter;"

application Ser. No. 17/524,067, entitled "Method and System for Entering and Exiting a Frequency Clamp Mode for Variable Frequency, Offline Switch-Mode Power Converters;"

application Ser. No. 17/524,117, entitled "Method and Apparatus for Digital, Closed-Loop Control of CRCM Switch-Mode Power Converters;"

application Ser. No. 17/524,126, entitled "Method and Apparatus for Over-Current Protection and CRCM Control in Power Converters;" and application Ser. No. 17/524,136, entitled "Method and Apparatus for Sensing the Input Voltage of a Power Converter."

BACKGROUND OF THE INVENTION

A power factor correction power converter is a power conversion stage that serves the purpose of interfacing an electronic load that does not appear resistive in nature (i.e., "constant power" or "constant current") with an electronic "alternating current" voltage source (i.e., the power grid, a power generator, etc.) or vice-versa (e.g., interfacing a DC source to an AC 'voltage' load, where the DC source is made to appear to the grid (load) as a resistive load (with a 'negative' resistance)). That is, the current drawn from an AC voltage source (and subsequently delivered to a load) is shaped to have substantially the same frequency content as the voltage and be substantially in-phase with the voltage. Alternatively, the current delivered to the AC load (i.e., grid) is substantially the same shape, frequency and phase as the (load/grid) voltage.

A common way to achieve this is to implement either an "average-current mode control" or a "constant on-time control" in a topology such as the "Boost" switch mode power supply topology. A voltage loop is closed around the converter to ensure the output voltage of the converter—on average—is substantially DC at a predetermined level (e.g. ~400V typically for one-world universal off-line power converters). Such a voltage loop is typically implemented in the analog domain as a Linear Time Invariant (continuous-time) control loop with a corresponding open-loop frequency response (bandwidth, gain margin and phase margin).

Despite the progress made in the area of power factor correction circuits and devices, there is a need in the art for improved methods and systems related to power factor correction.

SUMMARY OF THE INVENTION

Embodiments of the present disclosure relate in general to the field of electronics, and more specifically, to a system, apparatus and method for controlling a power factor of a switching power converter operating in a nonlinear, discrete control mode.

Embodiments of the present disclosure provide novel technical solutions for controlling power factor correcting power converter devices with improved gain and frequency.

In one embodiment, an apparatus for controlling a power converter includes a controller configured to detect an error in an output voltage of the power converter at a zero-crossing of a cyclically varying input signal and a compensator coupled to the controller and the power converter and configured to regulate the output voltage of the power converter in response to the error.

In one embodiment, the apparatus includes an on-time generator coupled to the power converter and the compensator, wherein the compensator is further configured to provide one of a plurality of operation levels to the on-time generator. In one embodiment, the plurality of operation levels comprises a constant on-time control signal. In one embodiment, the plurality of operation levels comprises a continuous conduction mode control signal.

In one embodiment, the power converter may include a bridgeless power supply circuit. In one embodiment, the power converter may include a diode bridge power supply circuit.

Embodiments of the present disclosure also provide a method for controlling a power factor of a power converter. The method may include detecting an error in an output voltage of the power converter at a zero-crossing of a cyclically varying input signal by a controller and regulating the output voltage of the power converter in response to the error by a compensator.

According to an embodiment of the present invention, a method for controlling a power factor of a power converter includes obtaining an output voltage of the power converter at a zero-crossing of a cyclically varying input signal, the output voltage being regulated by an on-time generator, and comparing, by a controller, the output voltage against a first predetermined range to obtain a comparison result. The method also includes selecting, by the controller, one of a plurality of operation levels of the on-time generator in response to the comparison result, the plurality of operation levels comprising a linear, discrete-time operation level and a nonlinear, discrete-time operation level.

The method can also include determining a status of a flag. When the flag is not set, the method includes determining whether the output voltage is within the first predetermined range, selecting the linear, discrete-time operation level when the output voltage is within the first predetermined range, and stopping the linear, discrete-time operation level when detecting a second zero crossing of the output voltage. The method further includes, selecting the nonlinear, discrete-time operation level when the output voltage is not within the first predetermined range, setting the flag, and stopping the nonlinear, discrete-time operation level when detecting a third zero crossing of the output voltage. The nonlinear, discrete-time operation level can include adjusting a width of an adaptive on-time pulse of the on-time generator by a first predetermined amount of time in a first half-cycle of the cyclically varying input signal adjacent to the zero-crossing of the cyclically varying input signal. The nonlinear, discrete-time operation level can further include adjusting the width of the adaptive on-time pulse of the on-time generator in a second half-cycle immediately following the first half-cycle by a second predetermined amount of time smaller than the first predetermined amount of time and resetting the flag. In some embodiments, the method includes sampling a second output voltage of the power converter at a set point that is not a zero crossing point of the cyclically varying input signal, determining whether the sampled second output voltage at the set point is within a second predetermined range greater than the first predetermined range, when the sampled second output voltage is within the second predetermined range, repeating the step sampling the second output voltage, and when the sampled second output voltage is not within the second predetermined range, increasing a width of a variable on-time pulse of the on-time generator to a maximum value for a remaining half-cycle of the cyclically varying input signal. The on-time generator can be configured to generate a plurality of signals having a constant on-time interval and a variable off-time interval. The constant on-time interval can be configured to ramp up a loop current flowing through an inductor from a low value to a high value and the variable off-time interval is configured to ramp down the loop current from the high value to the low value. The high value can follow a current envelope that is a function of the cyclically varying input signal, the constant on-time interval, and a constant inductance inductor.

Numerous benefits and advantages are achieved by way of the present disclosure over conventional techniques. For example, embodiments of the present disclosure provide a digital control for power factor correction (PFC) including multi-level, nonlinear control techniques that update values only at zero-crossings of the input signal. Embodiments of the present disclosure overcome problems associated with continuous-time, linear time invariant control (e.g., conventional analog proportional, integral or proportional, integral, derivative control) of the output voltage (e.g., bulk voltage) in a PFC system in which the bandwidth must be limited to a frequency far lower than the AC frequency of the input signal, since the control system would otherwise attempt to overcome the ripple (having twice the AC frequency) on the bulk capacitor and in doing so, compromise the power factor. These and other embodiments of the disclosure, along with many of its advantages and features, are described in more detail in conjunction with the text below and corresponding figures.

DETAILED DESCRIPTION OF THE INVENTION

Embodiments of the present disclosure relate to a system, apparatus and method for controlling a power factor of a switching power converter that may operate at a plurality of operation levels. In one embodiment, a linear, discrete-time operation level may be performed when small changes are made in an output voltage of the switching power converter. The linear, discrete-time operation level may include a PID (proportional, integral, differential) type compensation that is performed on the output voltage of the switching power converter. In one embodiment, a nonlinear, discrete-time operation level, e.g., a discrete conduction mode, may be performed when a difference between sampled output voltages in adjacent AC half-cycles exceeds a predetermined value (positive or negative) or a predetermined range.

Figure 1A:
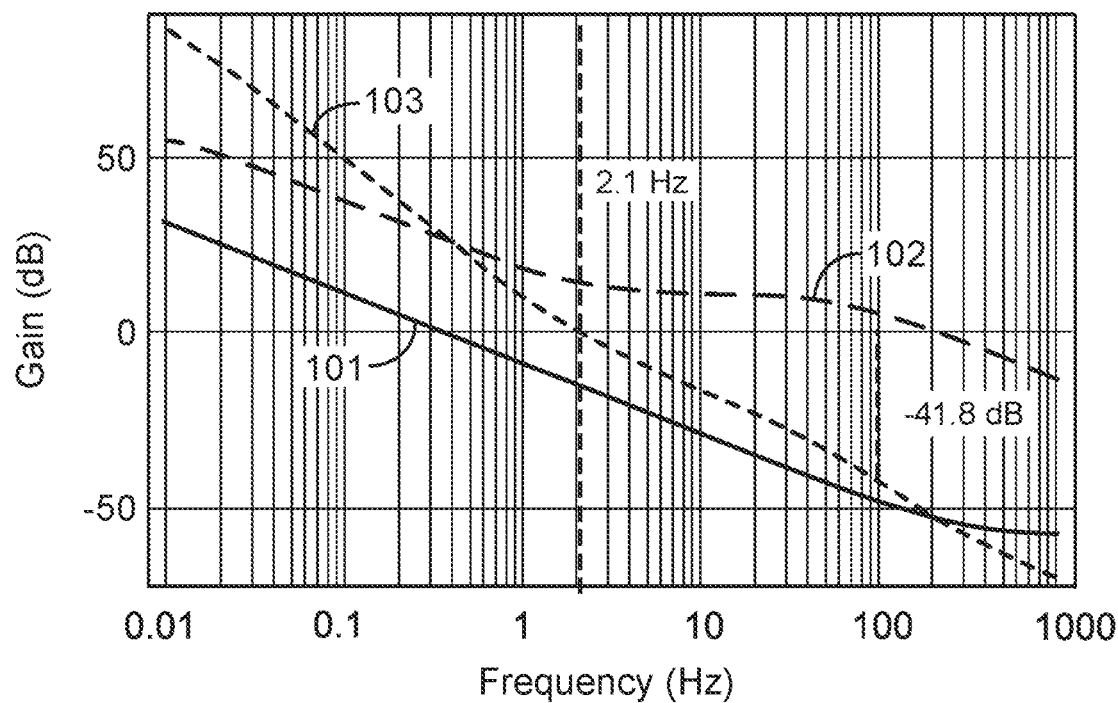
FIG. 1A is a graph illustrating a power factor correction (PFC) open-loop gain (in dB), a gain (in dB) of a plant, and a gain (in dB) of a compensator for explaining embodiments of the present disclosure.
Figure 1B:
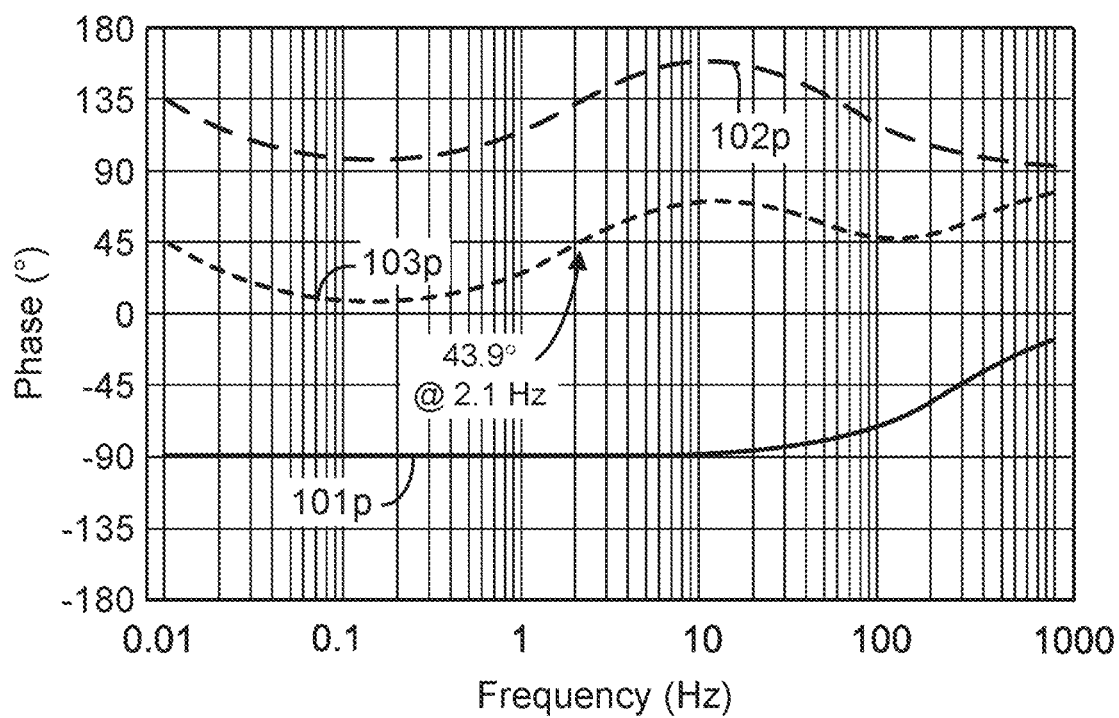
FIG. 1B is a graph illustrating a phase (in degrees) of the plant, a phase of the compensator, and a phase of the open-loop of a generic linear time invariant (LTI) power factor correction (LTI PFC) voltage loop for an offline compensated power converter that can be used to explain embodiments of the present disclosure.

FIG. 1A is a graph illustrating a power factor correction (PFC) open-loop gain (in dB), a gain (in dB) of a plant, and a gain (in dB) of a compensator for explaining embodiments of the present disclosure. FIG. 1B is a graph illustrating a phase (in degrees) of the plant, a phase of the compensator, and a phase of the open-loop of a generic, linear time invariant (LTI) power factor correction (PFC) voltage loop for an offline compensated power converter.

Referring to FIG. 1A, the x-axis represents the frequency in Hz, and the y-axis represents the gain in dB. Curve 101 denotes the gain of the power converter plant as a function of the control signal (i.e., the power stage voltage gain from $V_{IN}$ to $V_{OUT}$ as a function of on-time and switching frequency), curve 102 denotes the gain of a compensator of the power converter (i.e., taking feedback from the output and providing a control signal to the plant based on an error between a reference and the output voltage), and curve 103 denotes the gain around the open loop of the compensated power converter (i.e., from the input of compensator to the control signal to $V_{OUT}$), where $V_{IN}$ is the input voltage of a source (e.g., a plant, a power grid), Vref is a reference voltage, $V_{OUT}$ is the output voltage of the power converter, and Tctrl is the control signal to the power stage power converter (assuming CrCM). The loop gain at 100 Hz is 41.8 dB. It can be seen that the loop cross-over frequency of ~2.1 Hz, which is a low frequency, is necessary in order to achieve the ~−42 dB of loop gain (attenuation) at twice the lowest AC input frequency (~94 Hz) to meet the regulation requirements. A continuous-time LTI loop gain of much higher than ~−42 dB at twice the AC input frequency would result in the converter "attempting" to regulate to 'constant' input power instead of 'resistive' input power, meaning the power factor would suffer by the increasing input current, when the input voltage decreases near the AC zero crossings. Referring to FIG. 1B, curve 101p denotes the phase of the plant, curve 102p denotes the phase of compensator, and curve 103p denotes the open-loop phase of the complete system, which has a Phase Margin of 43.9 degrees at 2.1 Hz. Thus, the loop performance of an analog, continuous-time LTI implementation for a one-world universal power factor corrected switch-mode power supply is fundamentally limited in bandwidth and gain to a level similar to that shown in FIGS. 1A and 1B.

Accordingly, embodiments of the present disclosure provide for power factor correction of power converters that exhibits high gain and high frequency without causing loop instability and while preserving a minimally acceptable power factor.

An optimal power-factor-corrected universal offline switching-mode power supply (SMPS) will provide a number of functions, including:
1. The input current within a single AC half-cycle matches the voltage in shape (i.e., frequency content) and is in-phase with the voltage.
2. The amplitude of the input current waveform is such that the RMS value of the input current waveform (over that AC half-cycle) results in the energy taken out of the AC input voltage source matching the energy consumed by the load during that time, i.e., the average input power is equal to DC output power.

Embodiments of the present disclosure provide a discrete-time closed-loop control system, which may update the constant on-time control signal only at the AC zero crossing (where no power is processed). Since no current amplitude change will take place during the AC half-cycle of the input signal, the theoretical resulting power factor may approach or be equal to unity (i.e., the input current may be substantially sinusoidal-shaped and in-phase with a sinusoidal-shaped input voltage), and the system behaves like a resistor, whose resistive value does not change "continuously and slow enough," but instead discretely and only at zero-crossings. The system can sample (at a variety of sample rates, for example, faster than twice the AC frequency of the input signal) the output voltage between adjacent AC half-cycles. That is, the sampling system can be synchronized with the AC input signal (a cyclically varying input signal) in the embodiments described herein.

If a full AC cycle is described in terms of phase angle in radians, a full cycle (from rising edge zero-crossing to rising edge zero-crossing) will include phase angles from 0 to $2\pi$. Because embodiments of the present disclosure provide a regulated output (bulk) voltage to a load, the RMS value of the output voltage is sensed over time. In this case, it may be the RMS value from 0 to $\pi$ or from $1/2\pi$ to $3/2\pi$. The power converter yields the same exact result when it samples from any value to the same value $+\pi$ assuming that the output (bulk) voltage remains stable with an AC ripple at twice the AC input signal frequency. In one embodiment, the power controller samples the instantaneous value (single sample) of the output voltage at a specific phase angle (at intervals of $\pi$ radians), and without sensing/sampling the AC voltage ripple present on the output voltage. In this case, the sampling frequency is locked at twice the AC frequency and is synchronous with the AC frequency of the input voltage. In another embodiment, the power converter samples and regulates the RMS value of the output voltage. It is obvious to anyone skilled in the art that there are countless sampling schemes other than the ones specifically mentioned that will achieve a similar result, including techniques of oversampling, debouncing, noise-filtering, and the like.

Embodiments of the present disclosure provide a plurality of operation levels of regulation or feedback that can be implemented using a digital control scheme due to the nonlinear, discrete-time nature of sampling and control described herein. In some embodiments, the power converter may include a power factor correction circuit having different operation levels responding to different dynamic load conditions. It is noted that the converter can easily be set to regulate average bulk voltage, RMS bulk voltage, minimum bulk voltage, or peak/maximum bulk voltage. A person skilled in the art will readily understand to make changes between these set-points during operation depending on various sensed quantities, e.g., input RMS voltage, processed power, temperature, final output voltage (at the output of a succeeding DC/DC converter stage), etc. In such a digital system, the reference can also be changed/manipulated dynamically as desired or as is relevant to optimize overall converter performance.

Figure 2:
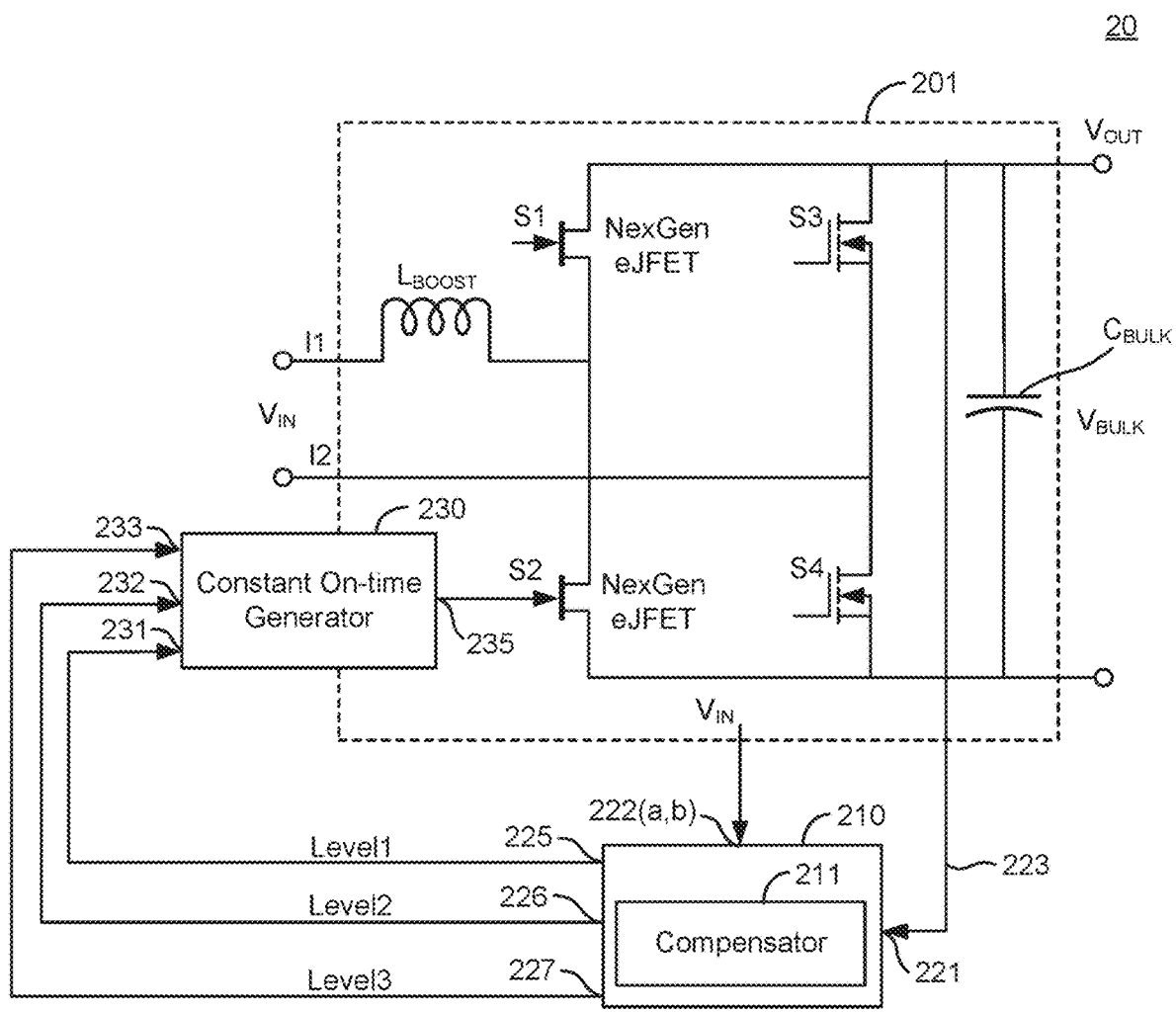
FIG. 2 is a block circuit diagram illustrating an exemplary control system for controlling a power factor of a switching power converter according to an embodiment of the present disclosure.

FIG. 2 is a block circuit diagram illustrating an exemplary hybrid control system 20 for controlling a power factor of a switching power converter with nonlinear, discrete-time control operation levels according to an embodiment of the present disclosure. Control system 20 includes a totem-pole bridgeless power factor correction (AC/DC) boost converter 201, a controller 210 including a compensator 211, and a constant on-time generator 230. Boost converter 201 includes a set of input terminals I1, I2 for receiving a cyclically varying input voltage $V_{IN}$, a boost inductor $L_{BOOST}$, a first switch S1, a second switch S2, a third switch S3, a fourth switch S4, and a capacitor $C_{BULK}$.

Controller 210 has a first input 221 coupled to a first terminal of capacitor $C_{BULK}$ for providing a feedback signal 223 of the output voltage $V_{OUT}$ to the controller, a second input 222(*a,b*) coupled to the terminals I1, I2 of input voltage $V_{IN}$ for determining the differential of the two input terminals and for detecting the zero crossing of the input signal as well as the RMS-voltage of the input signal, a first output 225 configured to output an operation level 1 signal ("small signal response"), a second output 226 configured to output an operation level 2 signal ("large signal response"), and a third output 227 configured to output an operation level 3 signal ("large step response"). Constant on-time generator 230 has a first input 231 configured to receive the operation level 1 signal, a second input 232 configured to receive the operation level 2 signal, a third input 233 configured to receive the operation level 3 signal, and an output 235 configured to turn on and off the switch S2. In one embodiment, switches S1 and S2 are Vertical GaN eJFETs, such as NXG2EA070R 170 of NexGen Power Systems, Inc.

According to embodiments of the present disclosure, hybrid control system 20 can operate at different operating conditions depending on the feedback signal. For example, hybrid control system 20 may operate in a normal operating condition when controller 210 detects a nominal output voltage that is within a predetermined range at a zero-crossing of input voltage $V_{IN}$, i.e., the error signal is of small amplitude, signaling to the controller that the output voltage $V_{OUT}$ changes or drifts slowly (e.g., over several cycles of the AC input signal) or not at all. In this case, controller 210 may output an operation level 1 signal ("small signal") to constant on-time generator 230 to make small changes to the ON-time of transistor S2 in order to keep the output voltage very near its target. This response is similar in nature to a traditional, analog LTI system, however with the exception that the bandwidth can be substantially higher for embodiments of the present disclosure (e.g., at least ½ the AC frequency or potentially equal to (i.e., 1/1) the AC frequency) than for the traditional one (e.g., 2.1 Hz as exemplified in FIGS. 1A and 1B). In one embodiment, the error signal may be of large amplitude, signaling to the controller that the output voltage is changing quite rapidly, or has changed enough compared to its target to reach some preset absolute value. In this case, controller 210 may output an operation level 2 signal ("large signal response") to constant on-time generator 230. This effectively extends the bandwidth of the converter only in the presence of large perturbations (typically aperiodic events), which can prevent larger $V_{OUT}$ deviations while affecting power-factor only marginally, if at all, and without causing instabilities. In another embodiment, controller 210 may output an operation level 3 signal ("large step response") to constant on-time generator 230 when it detects that the output voltage is not within a predetermined range, and allow the constant on-time generator to change to a different on-time immediately (instead of waiting for a zero-crossing). This greatly affects power-factor, but only in the single AC half-cycle of the AC cycle in which it occurs. Since this is expected to be a rare event, power factor is not expected to be affected overall in the long term. The conditions under which the different operation level signals are provided by the controller will be described in more detail below with reference to FIG. 4.

The following sections provide the different operation levels or compensation processes of the hybrid control system.

Level 1 Compensation Process (Operation Level 1; Small Signal Response)

In one embodiment, the power factor correction circuit may include proportional, integral, differential (PID) compensation; proportional, integral (PI) compensation; type II compensation; or other suitable types of compensation for regulating the output voltage to maintain an average value over the AC half-cycle of a cyclically varying input signal by making small changes to a constant on-time control signal. In one embodiment, the PID or PI control loop only operates on the average of the output voltage averaged over a half-cycle of the input AC voltage. The objective of this type of PID or PI control loop, which has a relatively low bandwidth (e.g., about 23 Hz), is to eliminate DC errors, i.e., the integral part of the PID or PI compensator is generally the dominant part. However, the PID or PI compensator will necessarily be slow to compensate a sudden change of a load since it is fundamentally limited by the relatively low bandwidth. The result of the low bandwidth and limited PI/PID response is, for example, a large droop in output voltage in response to a large load step from a low load current/power level to a high load current/power level. Therefore, the level 1 compensation process is typically utilized for small-signal control. This slow compensation or low bandwidth PID or PI control loop is referred to as an operation level 1 or a level 1 compensation process. The operation level 1 or level 1 compensation process is also referred to as a linear, discrete-time operation level and will be described in more detail with reference to FIG. 5 through FIG. 8.

Embodiments of the present disclosure provide novel nonlinear power control techniques for compensating a sudden load change. As described above, the operation level 1 has a low bandwidth (~23 Hz) and is generally suitable for a slow change of the output voltage over several cycles of the input signal. That is, the operation level 1 may not be able to react fast enough for a sudden change of the output voltage, e.g., when a laptop with an empty battery is connected to the power converter and causes the output voltage to droop substantially, which is a condition for which the operation level 1 may not be able to correct within a few cycles of the AC input signal. Accordingly, in addition to operation in level 1, embodiments of the present disclosure provide operation level 2 and operation level 3 compensation processes for large signal control and large step control.

Figure 3:
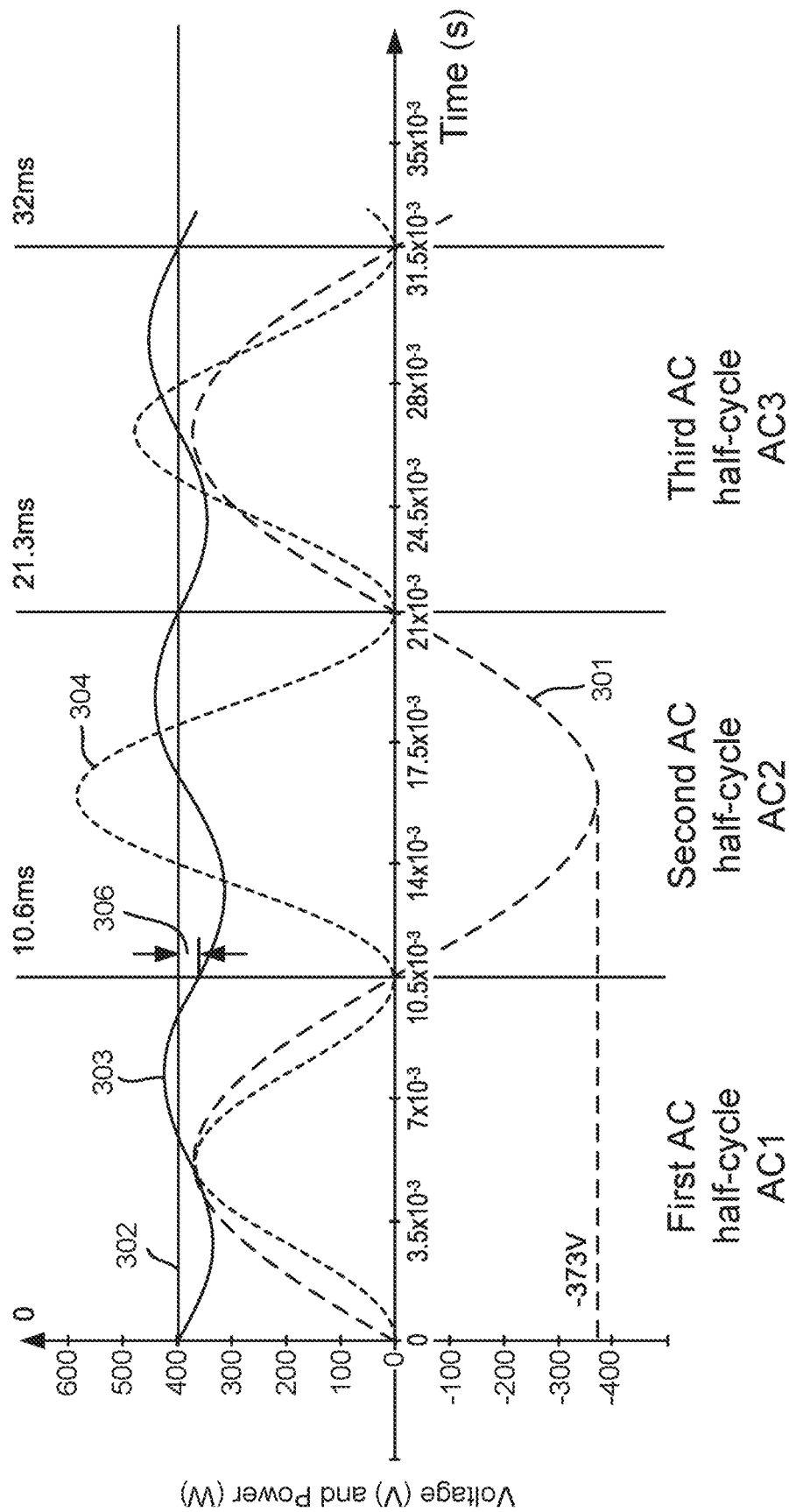
FIG. 3 is a graph illustrating an exemplary input voltage, an output voltage, and an input power for three AC half-cycles according to an embodiment of the present disclosure.

FIG. 3 is a graph illustrating an exemplary input voltage, an output voltage, and an input power for three AC half-cycles according to an embodiment of the present disclosure. Referring to FIG. 3, a cyclically varying input signal (e.g., voltage of the AC grid present at a wall socket) is represented by curve 301, an average output voltage is represented by curve 302, an output voltage including an AC ripple having twice the frequency of the cyclically varying input signal is represented by curve 303, and an input power taken from the power plant or AC grid (i.e., wall socket) is represented by curve 304. In one embodiment, the input power is a product of the input signal represented by curve 301 and an input current that is phase synchronous to the input signal. The x-axis represents time (seconds), and the y-axis represents both input and output voltages (V) for curves 301, 302, and 303 and input power (W) for curve 304. In the exemplary embodiment shown, the cyclically varying input signal has a frequency of 47 Hz (corresponding to a period of 21.3 ms) and an RMS amplitude of 264 V or a magnitude (i.e., peak amplitude) of 373 V. The output voltage (i.e., the bulk voltage) has a DC value of 400 V. It is understood that these numerical values are provided as examples and are not meant to be limiting.

Referring to FIG. 3, three AC half-cycles AC1, AC2, and AC3 are shown. Before time t=0 ms, i.e., before the first AC half-cycle AC1, the controller or compensator may operate at the level 1 compensation process, i.e., the power converter can provide a sufficient output voltage or output power to the load, and the controller may operate at a low bandwidth such as 20-50 Hz (or even as low as traditional linear continuous time systems, for example, about 2 Hz to about 10 Hz, as shown in FIGS. 1A and 1B). At the first half-cycle of the cyclically varying input signal (e.g., the time between 0 ms and 10.6 ms of the cyclically varying input signal of 47 Hz), the load requires more power than the level 1 compensation process could have provided due to the slow reaction from the controller being bandwidth limited. For example, the power converter could be powering a laptop that does not have a battery installed and is operating in its idle state until a user prompts an app to power up, which uses significant CPU and memory to execute. Since only a small amount of power was delivered historically, the "small signal response" (level 1 compensation) is demanding a small, constant on-time right before the launch of the app, and the amount of change the level 1 compensation can impose on the constant on-time per AC zero crossing is limited due to its limited bandwidth. So in the time immediately following the launch of the app (e.g., several AC cycles), the on-time is insufficient, and the output voltage keeps decreasing. As a result, an unacceptable output voltage droop may be generated. In this case, the controller described herein instead switches to the level 2 compensation process, which can perform a nonlinear, discrete-time control with an effective/apparent bandwidth significantly higher than the ~20-50 Hz bandwidth of the level 1 compensation process.

In one embodiment, the controller is configured to detect the immediate power consumption (e.g., the power consumption of the laptop) by sampling the output voltage illustrated by curve 303 at a zero crossing of the cyclically varying input signal illustrated by curve 301 after the first AC half-cycle AC1 and comparing the sampled output voltage with the average output voltage illustrated by curve 302 or the output voltage at the last AC zero crossing (e.g., at time=0 ms) to obtain a comparison result. That is, the controller samples the output voltage at twice the frequency of the input signal. When a difference 306 between the output voltage illustrated by curve 303 and the average output voltage illustrated by curve 302 at the zero-crossing of the input signal illustrated by curve 301 (or the output voltage at the last zero-crossing) exceeds a predetermined value, the controller may determine that the power converter cannot deliver the needed output power utilizing the operation level 1 due to its low bandwidth and select the level 2 compensation process. In this case, the controller may change the on-time interval in the second AC half-cycle AC2, which is the half-cycle immediately adjacent to the cross-point of the input signal, i.e., the half-cycle between the time 10.6 ms and 21.3 ms. For example, the controller may increase the on-time interval to obtain more input power (e.g., from the wall socket). The increase of input power is shown in the second AC half-cycle AC2.

Level 2 Compensation Process (Operation Level 2)

As discussed above, the operation level 1 is useful for regulating small changes in the output voltage, but may not operate fast enough when there is a sudden change in the output load. Accordingly, the operation level 2 can be implemented. In one embodiment, when the controller determines that the output voltage is not within a predetermined range (and thus out-of-range for operation level 1), the controller turns off the operation level 1 compensator and the feedback signal is inactivated during the AC half cycle, e.g., the second AC half-cycle AC2. The controller samples the output voltage at the zero crossing (e.g., at 10.6 ms) and compares the sampled output voltage with the target output voltage to obtain a comparison result. The controller increases (or decreases) the constant on-time (input power) in the second AC half-cycle AC2 based on the comparison result and a predetermined (or preprogrammed) $C_{BULK}$ capacitor value. The voltage difference for a time duration between zero-crossings for a known capacitance value can be used to compute the power taken from the capacitor during the previous AC half-cycle. As an example this computation could use the power deficiency between the output power taken from the capacitor by the load during AC half-cycle AC1 and the input power delivered to the capacitor by the converter power stage during AC half-cycle AC2 as inputs. The new on-time is programmed to match the 'old' power plus twice the deficiency. This will cause an equivalent excess of power, which will deliver all the required power to the load as well as replenish the energy that was 'missing' from $C_{BULK}$. At the succeeding AC zero crossing (e.g., at ~t=21.3 ms), the constant on-time is reduced, such that input power matches the load power, and the operation level 1 compensation process is resumed. Note that the feedback process is discrete-time because the controller only changes the control variable (e.g. the "constant on-time" of S2) at zero-crossing points of the AC input signal. In other words, the discrete-time feedback loop and the frequency of sampling are synchronized to the rectified version of the AC signal in the operation level 1. Further note that the feedback process is nonlinear in the operation level 2 (in addition to being discrete-time), since the change of the control variable (e.g. the "constant on-time" of S2) is pre-calculated for a single A/B two-step response only at trigger-points, where certain criteria are met. Thus operation level 2 is not continuously active, but only activated at certain times. This makes operation level 2 nonlinear in addition to being discrete-time.

In one embodiment, when the comparison result shows that the sampled output voltage is below the average output voltage illustrated by curve 302, i.e., the difference 306 is negative, the controller increases the on-time interval of the switch S2 by a certain first amount during the second AC half-cycle AC2. The certain first amount can be increased by adding a predetermined time interval to a current on-time interval or by multiplying the current on-time interval by a multiplication factor. This process is a nonlinear and a time-discrete process because the increased on-time interval is added to the current on-time interval (nonlinear) or the current on-time interval is increased by a multiplication factor (nonlinear) and only in the second AC half-cycle (time-discrete). The term "nonlinear" refers to a change of a variable (e.g., an input power) in a nonlinear manner, such as changing the input power using addition, subtraction, or multiplication operations.

In one embodiment, when the comparison result shows that the sampled output voltage illustrated by curve 303 is above the average output voltage illustrated by curve 302), i.e., the difference 306 is positive, the controller decreases the on-time interval of the switch S2 by a certain second amount during the second AC half-cycle AC2. The certain second amount can be decreased by subtracting a predetermined time interval from a current on-time interval or by multiplying the current on-time interval by a multiplication factor. This process is a nonlinear and time-discrete process because the decreased on-time interval is subtracted from the current on-time interval or the current on-time interval is reduced by a multiplication factor (nonlinear) and only in the second AC half-cycle (time-discrete). It is noted that the nonlinear and time-discrete level 2 compensation process occurs only within an AC half-cycle so that the power factor is maintained.

In accordance with the present disclosure, a difference between adjacent, AC half-cycle sensed output voltage average values (e.g., difference 306 between the output voltage illustrated by curve 303 and the average output voltage illustrated by curve 302 at the zero-crossing of the input signal illustrated by curve 301 in FIG. 3) is compared with a predetermined value (which can be a positive or negative value) or a predetermined range. When the difference exceeds the predetermined value or predetermined threshold, the compensator of the power converter will take certain actions. When the difference does not exceed the predetermined value or predetermined threshold, no action will be taken. In some embodiments, the actions may include a 2-step nonlinear control procedure illustrated as follows.

Step A: based on the difference value in the sampled output voltage, a normalized step is defined in the operating point. For constant on-time control systems, this may be an additive or multiplicative difference in the on-time interval. Referring to FIG. 3, at the zero crossing point at t=10.6 ms, the controller determines how much power is missing in the first AC half-cycle AC1 (i.e., between t=0 ms and t=10.6 ms) and increases that amount of missing power in the intermediately following AC half-cycle AC2 (i.e., t=10.6 ms to t=21.3 ms). The amount of power missing can be determined based on the voltage drop at the capacitor $C_{BULK}$. In the example shown, at the AC zero-crossing directly preceding the sampling/compare step in which the difference crosses the predetermined threshold for activating this operation level 2, a factor of two (i.e., twice) of the normalized step value may be taken for the AC half-cycle AC2 based on the determined missing power. In one embodiment, the controller also sets a level 2 flag indicating that the compensator is in the level 2 compensation process.

Step B: following the AC half-cycle where the 2× step size was taken (e.g., to a higher on-time value), a decrease by a factor of 1× may be taken (e.g., in the third AC half-cycle AC3). As shown in the exemplary embodiment of FIG. 3, the additional input power is twice the nominal input power in the second AC half-cycle AC2 and the input power in the third AC half-cycle AC3 is decreased with respect to the doubled input power. It should be noted that the power change only affects the amplitude (size), thereby preserving the shape of the input power. The controller resets the level 2 flag after completing step B indicating that the compensator is no longer in the level 2 compensation process.

In a numerical example, when the average output voltage difference exceeds 20V (e.g., from 400V in one AC half-cycle to 380V in the following AC half-cycle), a 2 µs time increase in the (constant) on-time is implemented in the following AC half-cycle (e.g., an increase in the on-time from 5 µs to 7 µs), and then a 1 µs decrease in the on-time for one or more subsequent AC half-cycles (e.g., a decrease in the on-time from 7 µs to 6 µs).

In one embodiment, this additional large-signal feedback control is then only active, and in some cases, exactly active, for two consecutive AC half-cycles after being activated. The level 2 compensation process will be described in additional detail below with reference to FIG. 4.

In another exemplary embodiment, the controller may enter the level 2 compensation process while operating the level 1 compensation process loop with a lower gain bandwidth in order to maintain small-signal stability. For example, in the first AC half-cycle AC1 between t=0 ms to t=10.6 ms, the average output voltage decreases from ~400V to ~370 V as measured at the AC zero-crossings. In addition to average output voltages, the instantaneous levels can be measured at the corresponding AC zero-crossings. This 30 V difference triggers the level 2 control loop to become active. The (constant) on-time is consequentially increased time discretely at the time of the AC zero-crossing (i.e., t=10.6 ms) by a large enough amount to refill the bulk capacitor back up to its nominal level by the following AC zero-crossing (i.e., t=21.3 ms).

In one numerical example, the converter operates at the operation level 1 and at a nominal level of 2 W under a no load condition or very light load condition. During the first AC half-cycle AC1, a laptop or notebook computer with a completely discharged battery having a maximum power of about 200 W is plugged into the converter, thereby causing the output voltage at the bulk capacitor to drop significantly. The controller determines that the operation level 1 is not able to deliver the needed power and switches to the operation level 2 in the second AC half-cycle AC2, which increases the input power to 400 W (step A of level 2) in order to provide 200 W to charge the depleted battery and 200 W to recharge the bulk capacitor. In the third AC half-cycle AC3, the controller reduces the input power back to 200 W (step B of level 2), which is sufficient to charge the battery since the bulk capacitor is fully charged. It is a nonlinear process because the controller increases the input power by adding a certain amount to the nominal input power, and the operation level 2 only lasts the second and third AC half-cycles. The nonlinear process is also time discrete because the feedback signal is provided to the compensator when the controller samples the output voltage at the zero-crossings of the input signal. Therefore, in some embodiments, the constant on-time decreases in such a manner that the average input power as illustrated by curve 304 is consistent with the new DC load power.

Level 3 Compensation Process (Operation Level 3)

Embodiments of the present disclosure also provide an additional level compensation process that can be utilized as an emergency operation level compensation process. This emergency operation level compensation process can be referred to as a level 3 compensation process or operation level 3. In this embodiment, an abnormal condition detection circuit or unit is utilized to detect an abnormal charging condition during which a maximum voltage or power is requested by the load. In one embodiment, the level 3 compensation process is activated when the output voltage falls below a current voltage threshold or rises above the current voltage threshold. In one embodiment, a controller in the power converter may sample the output voltage a plurality of times within an AC half-cycle (e.g., at a fixed sampling rate that may be significantly higher than the AC frequency, and not necessarily synchronized to it), and not only at the zero-crossing and react, for example, immediately, when it detects that the output voltage falls below a predetermined low threshold by increasing the on-time interval to the maximum value (e.g., instantaneously or immediately and for the remainder of the AC half-cycle). In one embodiment, when the output voltage is detected to be above a predetermined high threshold at a set point within the AC half-cycle, the controller may reduce the on-time interval or even turn off the on-time interval completely for the remainder of the AC half-cycle.

As used herein, the level 1 compensation process is referred to as a linear, discrete-time process, and the level 2 and level 3 compensation processes each are referred to as nonlinear, discrete-time processes. The linear (PID or PI compensation or level 1 for small-signal control) and non-linear operation levels (level 2 for large-signal control and level 3 for large-step discrete perturbation) will be described in more detail below.

The power level, for example, prior to the AC zero crossing 0 at time t=0 ms, can be approximated or calculated based on the input voltage, which can be sensed or measured as an RMS value; fixed circuit parameters, for example, an inductance value; and the (constant) on-time enforced by the small-signal loop. For example, the power level of the AC half-cycle prior to t=0 ms can be approximated by calculating an average input current that is a function of the input voltage, the inductance value and the constant on-time interval. The same power level is processed in the first AC half-cycle shown from t=0 ms to t~10.6 ms, but clearly, the load took a step (i.e., a sudden load change) to consume more power, thereby depleting the bulk capacitor. If the load step occurs, for example, immediately, after the AC zero crossing (e.g., at t=0.1 ms), then the new load power level can be estimated by the previous power level, the AC frequency correlated to the "distance" between AC zero crossings, and the capacitance value of the bulk capacitor. The estimated difference in the output power level from the previous AC half-cycle to the current AC half-cycle may be compensated for by increasing the input power in the subsequent AC half-cycle. As an example, the input power can be doubled by increasing the on-time interval by an amount based on the input voltage. This is implemented as step A of operation level 2 with the level 2 flag set to a Boolean value. In some embodiments, the input power is exactly doubled to provide an optimal solution. As will be evident to one of skill in the art, the bulk capacitor will be characterized by a lower energy state since the load was consuming more energy from the bulk capacitor than the converter delivered to the bulk capacitor. Accordingly, embodiments of the present disclosure replenish only this energy deficiency and not additional energy in order to bring the capacitor voltage back to exactly the target and not greater, while delivering the full new power level to the load. If the power was tripled or quadrupled, this would run the risk of over-voltage on the capacitor, which could cause large voltage perturbations on the system and, in some cases, catastrophic failure of a component from over-voltage stress (e.g., the capacitor could vent). Then, the new output power level is matched afterwards at the third AC half-cycle (step B with the level 2 flag reset), and the level 2 compensation process or operation level 2 is disabled until the level 2 flag is set again to trigger step A and step B again. The operation flow will be described in more detail below.

In a power supply that may see large load steps, one of the most important performance measures is the reaction to such load steps, also referred to as the regulation of such load steps. The load step response of any closed-loop system, if the step is over a wide range of loads from light load to heavy load, is an initial dip in the output voltage, or the bulk voltage, followed by a ringing-in sequence characterized classically as a sequence of "undershoot" and "overshoot" voltages decaying in a naturally logarithmic fashion before coming to a steady-state level with some regulation error, which may be small.

The rate of the logarithmic decay of error/ringing as well as the initial "undershoot" voltage are functions of the gain bandwidth of the system as well as the phase margin. The higher in frequency the loop can be closed at the same phase margin, the better the performance of the power supply. Having a practical, natural limit of 2-4 Hz as the maximum possible bandwidth of the loop means the load-step response is slow, and the output voltage dip can be deep and/or a very large capacitor can be employed on the output ($C_{BULK}$) in order to have enough energy reserves that a large load step results in a less deep voltage dip in view of the slow loop response. Embodiments of the present disclosure thus allow for selection of a physically smaller and cheaper bulk capacitor, while easing the constraints and/or operating envelope of a succeeding DC/DC converter stage and maintaining tight regulation of the final output voltage without any residual of the AC frequency or its harmonics.

One or more embodiments of the present disclosure may provide the following advantages and benefits.
1. Embodiments optimize the loop bandwidth, for example, to exactly its optimum value, which results in no loop gain at frequencies higher than twice the AC frequency of the input signal and as much loop gain as possible (i.e., a stability criterion) at the AC frequency and lower frequencies. The Nyquist stability criterion would suggest a loop bandwidth just below the AC frequency and tracking whatever the AC frequency might be.
2. Embodiments further augment the loop gain with a large-signal response in addition to the small-signal response to discretely, and in some cases, only if necessary, dramatically increase the effective loop gain for a single AC period while introducing no instability problems and resulting in no power factor implications (i.e., the power factor is retained).
3. Embodiments further augment the hybrid (i.e., level 1 and level 2 loop combination) loop with a discrete one-time large-step response if needed that compromises power factor in only a single AC half-cycle and dramatically increases the effective loop gain in rare, large-perturbation scenarios.

According to embodiments of the present disclosure, the controller may periodically sample the output voltage at zero-crossing points of the cyclically varying input signal and determine whether the sampled output voltage is within a predetermined range. When the sampled output voltage is determined to be within the predetermined range, the controller may regulate the output voltage using the operation level 1 (i.e., discrete-time PID or discrete-time PI control) and the feedback signal. When the controller determines that the sampled output voltage is not within the predetermined range, the controller may regulate the output voltage using the operation level 2, i.e., increasing or decreasing the input power in the following AC half-cycle of the input signal using step A (e.g., changing the on-time by means of addition or subtraction) immediately following with step B as shown in FIG. 3. In one embodiment, when the controller determines that the feedback signal within an AC half-cycle is outside a threshold value that is either above or below the threshold value, the controller may react with the operation level 3 by increasing the on-time interval to its maximum value when the feedback signal is below the threshold value or by stopping all operation levels when the feedback signal is above the threshold value. In one embodiment, the controller may also perform the operation level 3 when it determines that the sampled output voltage is outside a second determined range that is greater than the predetermined range. The change to constant on-time may be allowed at any time and not restricted to AC zero crossings for operation level 3.

Figure 4:
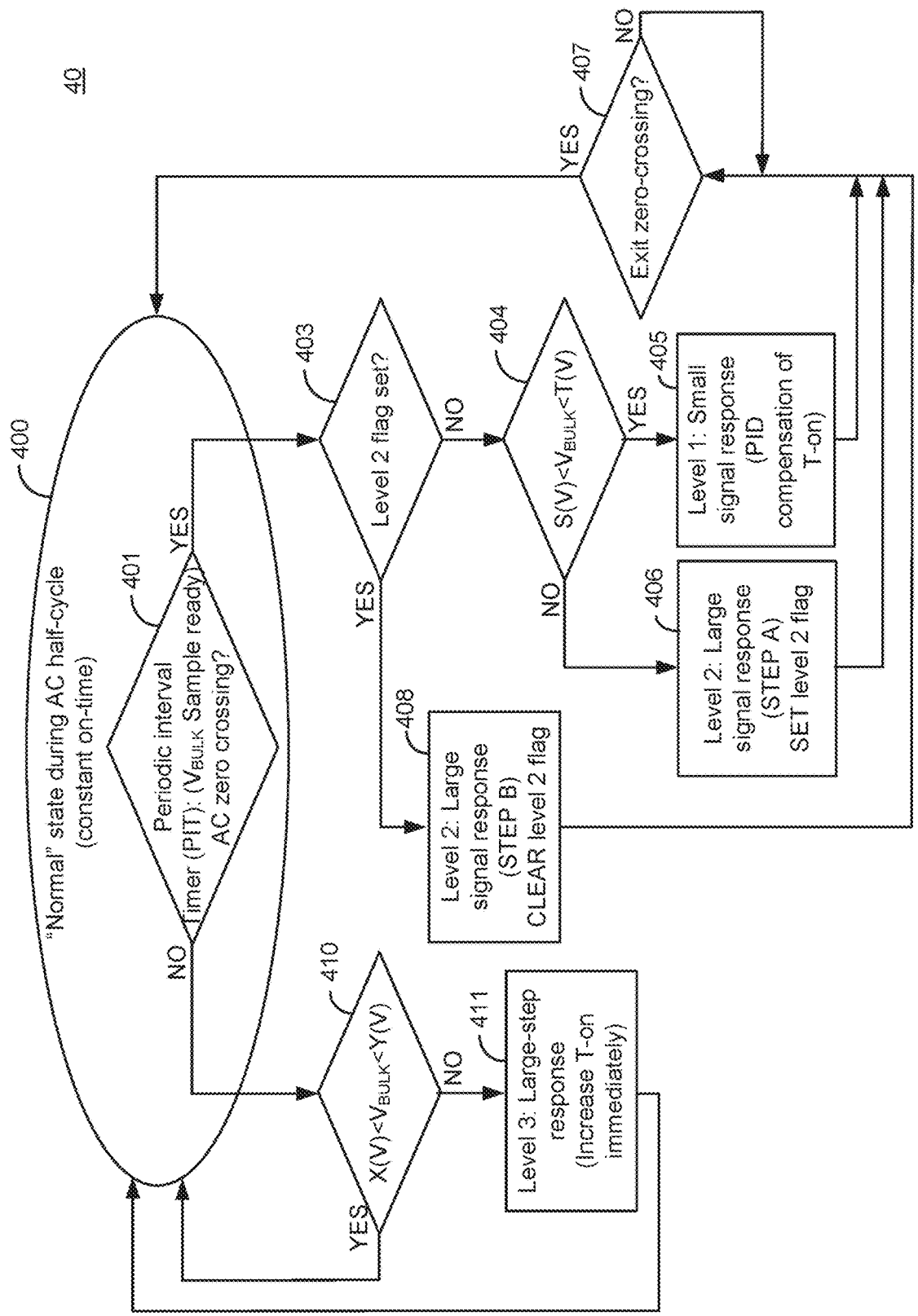
FIG. 4 is a flowchart illustrating a method for controlling a power factor of a switching power converter according to an embodiment of the present disclosure.

FIG. 4 is a flowchart illustrating a method 40 for controlling a power factor of a switching power converter according to an embodiment of the present disclosure. Method 40 begins at operation 400. Operation 400 includes a normal state operation during an AC half-cycle, i.e., operation 400 performs the operation level 1 in the normal state for a small signal loop control with a constant on-time interval. The switching power controller may include a periodic interval timer (PIT) that samples an amplitude of the output voltage $V_{BULK}$ at a zero-crossing of the cyclically varying input signal (e.g., AC input voltage of a power plant or AC grid) at operation 401. When operation 401 determines the presence of the output voltage $V_{BULK}$ at the zero-crossing of the input signal (YES in 401), method 40 proceeds to operation 403.

Operation 403 determines a state (logic value) of a level 2 flag. If the level 2 flag is not set (e.g., the flag bit=0), method 40 proceeds to operation 404. Operation 404 determines whether the output voltage $V_{BULK}$ is within a first predetermined range having an upper limit T(V) and a lower limit S(V). If the output voltage $V_{BULK}$ is determined to be within the first predetermined range (YES in 403), operation 405 selects the operation level 1 for the small signal response. In one embodiment, the operation level 1 is a linear operation level including a PID compensation having a constant on-time interval and variable off-time interval for the control signals. Operation 407 determines whether the periodic interval timer (PIT) detects the zero-crossing of the input signal. If the zero-crossing of the input signal is detected, method 40 returns back to operation 400 (normal state with constant on-time control signals).

If operation 404 determines that the output voltage $V_{BULK}$ is not within the first predetermined range (NO in 404), i.e., the output voltage $V_{BULK}$ is higher than T(V) or lower than S(V), operation 406 selects the operation level 2 for the large signal response using step A described above and sets the level 2 flag. For example, the operation level 2 corresponds to the increase of the input power in the second AC half-cycle AC2 of FIG. 3.

When operation 403 determines that the level 2 flag is set (YES in 403), operation 408 performs step B of the level 2 compensation process corresponding the operation level 2 to decrease the input power in the third AC half-cycle of FIG. 3 for the large signal response and resets or clears the level 2 flag and proceeds to operation 407. Operation 407 determines whether the periodic interval timer (PIT) detects the zero-crossing of the input signal. In one embodiment, the periodic interval timer may be included in the controller. If the zero-crossing of the input signal is detected, method 40 returns back to operation 400 (normal state with constant on-time control signals, i.e., operation level 1). In one embodiment, operation 400 determines that the output voltage $V_{BULK}$ is not ready for sampling at a zero-crossing of the input signal, e.g., the periodic interval timer (PIT) does not detect an expected value of the output voltage at t=0 ms. In this case, method 40 proceeds to operation 410, which includes sampling the output voltage $V_{BULK}$ at a certain time between t=0 ms and t=10.6 ms and determining whether the output voltage $V_{BULK}$ is within a second predetermined range having an upper limit Y(V) and a lower limit X(V). The second predetermined range is greater than the first predetermined range. In one embodiment, Y(V) is greater than T(V), and X(V) is greater than S(V).

When operation 410 determines that the output voltage $V_{BULK}$ is not within the second predetermined range (NO in 410), method 40 proceeds to operation 411, which includes selecting the operation level 3 for a large-step response. In one embodiment, the operation level 3 includes increasing the on-time interval to the maximum value for the remainder of the AC half-cycle. For example, when the output voltage $V_{BULK}$ is sampled at t=4 ms and it is determined that the sampled value is not within the second predetermined range, operation 411 will increase the on-time interval to its maximum on-time value and keep the maximum on-time value until the end of the first AC half-cycle AC1 (i.e., during the time between t=4 ms and t=10.6 ms). In one embodiment, the maximum on-time value may be set as a function of the input voltage. For example, the maximum on-time can be set to achieve a power level of 320 W for a 240 W converter, although it could be increased to a higher level. In one embodiment, a specific power level can be predetermined for operation level 3, and a corresponding maximum on-time is then set to correspond to the predetermined power level for operation level 3 to prevent over-current stress in the switches or saturation effects in the PFC inductor. When operation 410 determines that the output voltage $V_{BULK}$ is within the second predetermined range (YES in 410), method 40 proceeds to return back to operation 400 and repeats.

Embodiments of the present disclosure provide several advantages and benefits over existing systems and methods by providing feedback signals exactly and only during the period around zero-crossings of the AC input signal (i.e., when the sinusoidal-shaped input voltage is near zero).

The hybrid control technique utilizing level 1+level 2+optionally/potentially levels 2a, 2b, etc., in which progressively higher trigger thresholds are utilized, and optionally/potentially levels 3a, 3b, etc., in which progressively lower/higher thresholds are utilized, described herein, utilizes nonlinear, discrete-time control techniques implementing changes to the control signal exactly and only during the period near AC zero crossings.

Figure 5:
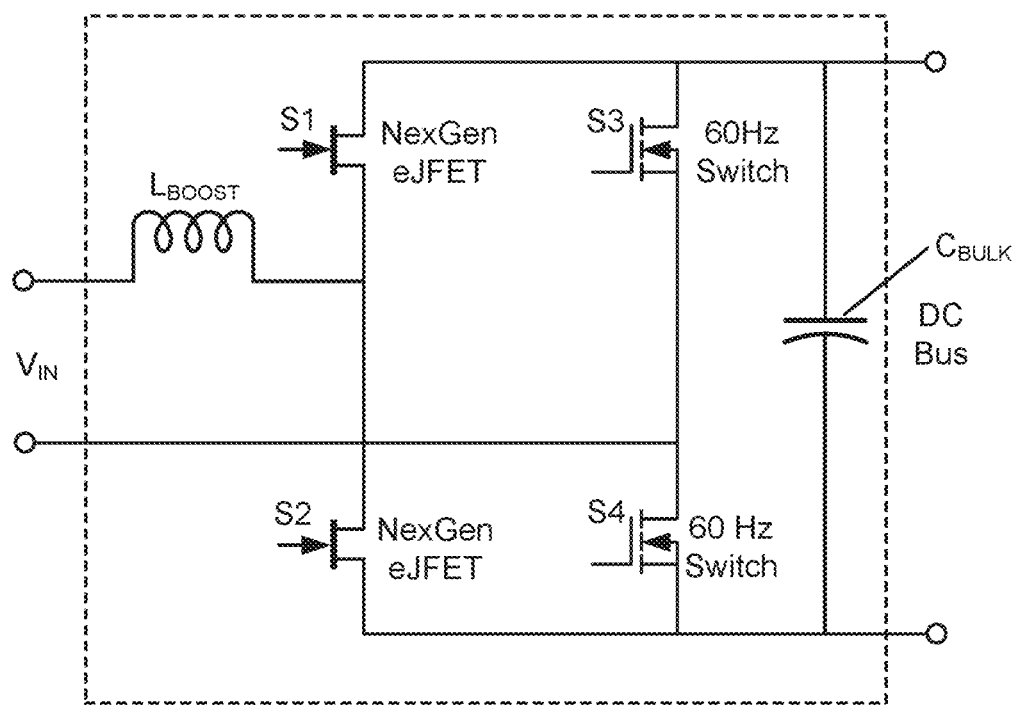
FIG. 5 is a block circuit diagram illustrating an exemplary power factor correction circuit of a totem-pole bridgeless critical conduction mode boost power converter circuit with a constant on-time control according to an embodiment of the present disclosure.

FIG. 5 is a block circuit diagram illustrating an exemplary power factor correction circuit of a totem-pole bridgeless critical conduction mode boost power converter circuit 50 with a constant on-time interval according to an embodiment of the present disclosure. In the example shown in FIG. 5, a controller is configured to operate in the operation level 1, and a constant on-time generator is configured to provide constant on-time control signals to switch S2 during the positive part (i.e., the positive half-cycle) of the input AC voltage waveform and to switch S1 during the negative part (i.e., the negative half-cycle) of the input AC voltage waveform. The controller is further configured to provide control signals to turn on and turn off switches S1, S2, S3, and S4 according to the current flow and the polarity of the AC input voltage. For example, in the positive half cycle of the cyclically varying input signal $V_{IN}$, switch S4 is turned on and switch S3 is turned off for the entire AC half-cycle by the controller, and S2 is the "control switch" receiving the "constant on-time" signal. However, for example, in the negative half cycle of the cyclically varying input signal $V_{IN}$, switch S4 is turned OFF and switch S3 is ON for the entire AC half-cycle by the controller, and S1 is the "control switch" receiving the "constant on-time" signal.

Figure 6:
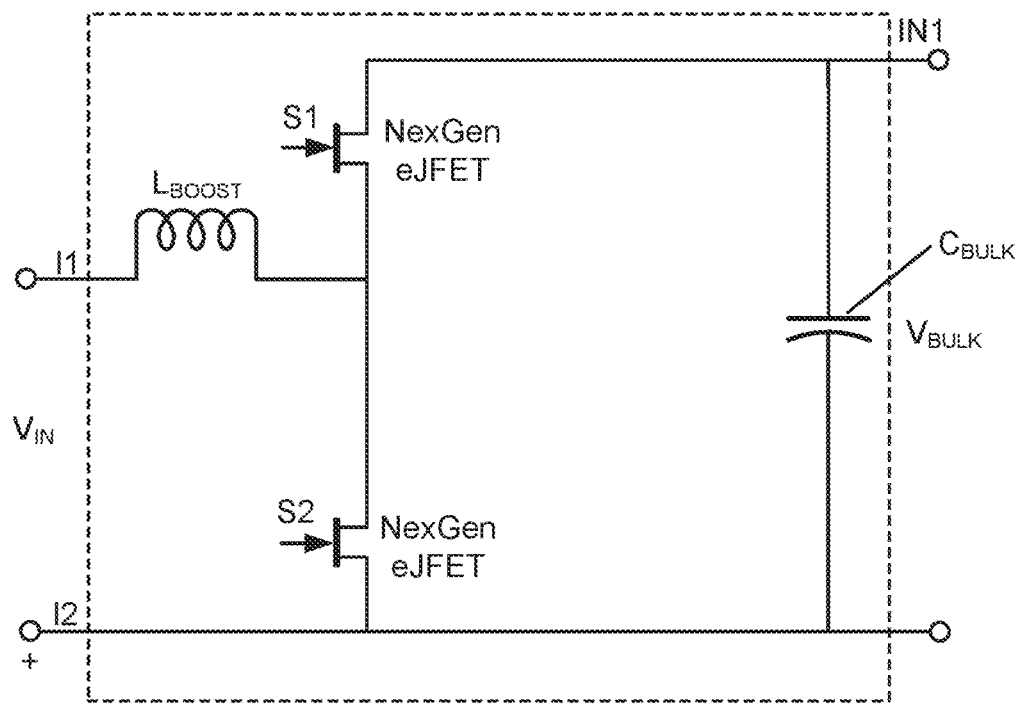
FIG. 6 is a block circuit diagram illustrating an operation of the totem-pole bridgeless critical conduction mode boost power supply circuit when the input voltage polarity is positive according to an embodiment of the present disclosure.

FIG. 6 is a block circuit diagram illustrating an operation of the totem-pole bridgeless critical conduction mode boost power supply circuit 60 when the input voltage polarity is positive according to an embodiment of the present disclosure. This figure is equivalent to FIG. 5 with S4 replaced by a short-circuit and S3 replaced by an open-circuit to indicate the switch-states of S3/S4 during the positive half-cycle of the AC input voltage signal. Totem-pole bridgeless critical conduction mode boost power supply circuit 60 effectively operates in the following way when the input voltage $V_{IN}$ is in the positive half of the cycle. The input voltage $V_{IN}$ connected to the terminals I1, I2 is higher at the input terminal I1 connected to $L_{BOOST}$ compared to the input terminal IN1 connected to $V_{BULK}$. As compared with FIG. 5, switch S3 (turned off) and switch S4 (turned on) are not shown for reasons of clarity.

Step 1: switch S2 is turned on for a pre-determined on-time interval (constant on-time), which does not change substantially over the AC half-cycle.

Step 2: During the time when switch S2 is conducting, the current in $L_{BOOST}$ is ramping up, for example, linearly, to the extent the input voltage remains substantially constant during the switch S2 conduction period.

Step 3: switch S2 is turned off after expiration of the pre-determined on-time. The current in $L_{BOOST}$ has reached a peak-value that is a function of the input voltage during S2 conduction period and the duration of the switch S2 conduction period.

Step 4: After switch S2 is turned OFF and the conduction channel is no longer carrying any current, switch S1 is turned ON until the current in $L_{BOOST}$ reaches 0 A.

Step 5: During the time when switch S1 is conducting, the current in $L_{BOOST}$ is ramping down, for example, linearly, to the extent the input voltage and output voltage remain substantially constant during the switch S1 conduction period. The time S1 is conducting depends on the current in $L_{BOOST}$ at the time of switch S1 turning ON, and the voltage-difference between output voltage and input voltage.

Step 6: switch S1 is turned OFF at the time the current in $L_{BOOST}$ reaches 0 A.

Step 7: Approximately at the time switch S1 is completely turned OFF and its channel is no longer conducting current, switch S2 is turned on again, and the process repeats from step 1. The steps 1 through 7 are the operation level 1 compensation process shown in FIG. 4. The controller is configured to control the RMS current flowing through the inductor in such a way that the average input power is equal to the average output power, and the input current has the same frequency content as the input voltage and is in-phase with the input voltage. This linear operation level is achieved by using a constant on-time of the control switch S2 across the positive AC half-cycle, which can be combined with CrCM operation in which the next switching cycle commences exactly at the time the inductor is demagnetized to 0 A. The inductor current flowing through the boost inductor of these seven steps is described in FIG. 7. This process is also referred to as critical conduction mode having constant on-time control signals that do not change appreciably during an AC half-cycle and having "off-time" that is only exactly enough to completely demagnetize the inductor to 0 A.

Figure 7:
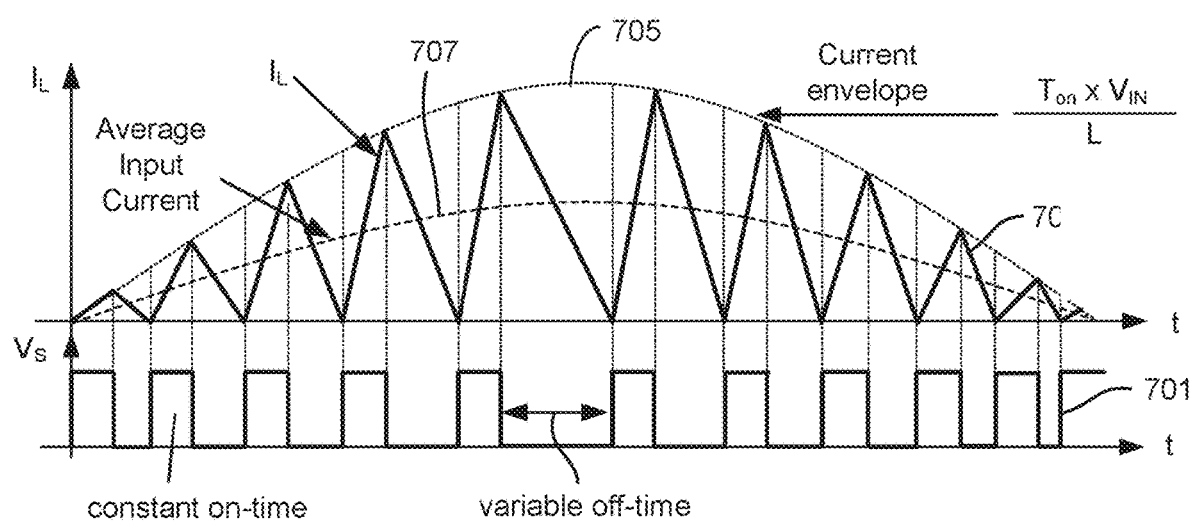
FIG. 7 is a graph illustrating a low switching frequency operation of a power converter circuit with a constant on-time control according to an embodiment of the present disclosure.

FIG. 7 is a graph illustrating a low switching frequency operation of a power converter circuit with constant on-time control signals during an AC positive half-cycle according to an embodiment of the present disclosure. Referring to FIG. 7, curve 701 denotes constant on-time control signals having variable off-time intervals, which are configured to turn on and off switch S2 of FIG. 6. Curve 703 denotes an inductor current flowing through the inductor $L_{BOOST}$. Curve 705 (dotted line) denotes a current envelope during an AC half cycle. Curve 707 (dashed line) denotes an average input current. As shown in FIG. 7, constant on-time control signals have a constant on-time interval on every switching cycle and a variable off-time interval. The current envelope illustrated by curve 705 is a function of the on-time interval, the amplitude of the input voltage, and the inductive value of the inductor $L_{BOOST}$. The current envelope can be calculated using the relation $T_{on}*V_{IN}/L$, where $T_{on}$ is the on-time interval, $V_{IN}$ is the amplitude of the input voltage, and L is the inductance value of the inductor. Since the on-time interval and the inductance value are constant, the current envelope is linearly proportional to the input voltage.

Referring to FIG. 6, switch S2 is referred to as the "control switch" during the positive AC half-cycle, because it controls the peak current charged in the inductor. Switch S1 is referred to as the "SR switch" because it achieves Synchronous Rectification. It should be noted that a diode would suffice in its place. The circuit description becomes relative for the negative half-cycle of the AC input signal. As discussed in relation to FIG. 5, during the negative AC half-cycle, switch S4 is turned OFF, and switch S3 is turned ON. This condition of turned-off switch S4 and turned-on switch S3 during the negative AC half-cycle as discussed in relation to FIG. 5 is shown in FIG. 8, where S3 is replaced by a short-circuit and S4 is replaced by an open-circuit, and the diagram is re-drawn for clarity as compared to FIG. 5.

Figure 8:
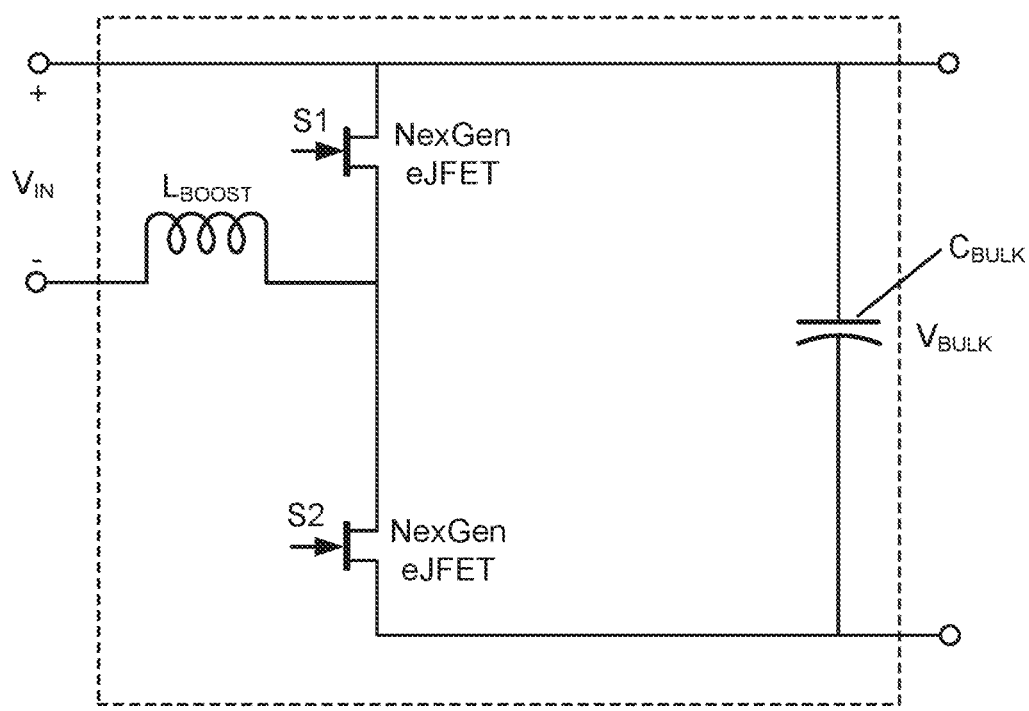
FIG. 8 is a block circuit diagram illustrating an operation of the totem-pole bridgeless critical conduction mode boost power supply circuit when the input voltage polarity is negative according to an embodiment of the present disclosure.

FIG. 8 is a block circuit diagram illustrating an operation of the bridgeless critical conduction mode totem-pole boost power supply circuit when the input voltage polarity is negative according to an embodiment of the present disclosure. Inductor $L_{BOOST}$ is now charged with current flowing from right to left by switch S1 to its peak value, and discharged (i.e., back to 0 A) by switch S2 through $V_{BULK}$. It is therefore clear that during this AC half-cycle, with negative input voltage polarity, switch S1 is operated as the "control switch," while S2 is operated as the "SR switch" (synchronous rectifier). Other than this swapping of roles of S1 and S2, and the polarity change of inductor current, the operation is entirely equivalent in this half-cycle to the operation described above with respect to the positive half-cycle in relation to FIG. 6.

Since the objective of the switching power converter is to control the RMS inductor current in such a way that the average input power equals the average output power, and the input current has the same frequency content as the input voltage and is in-phase with the input voltage, the critical conduction mode control converter should approximately ensure a constant on-time of the control switch across the AC half-cycle.

If the control system is linear and continuous-time (meaning the control variable on-time interval is changed continuously based on a filtered response to the output voltage), then the gain and bandwidth of the loop is set to ensure that the rate-of-change of the control variable is small enough that it does not effectively change appreciably within a single AC half-cycle, meaning that the gain and bandwidth are small. This has the disadvantageous consequence that the control variable cannot change appreciably from one AC half-cycle to the next.

If, however, the control signal is discrete-time, and the updates are associated with AC zero crossings only, where no power is processed, the control variable can change (amplitude-wise) to any degree desirable (gain), and the only criteria for maximum gain becomes the loop stability criteria, for example, sufficient gain and phase margin to ensure robust stability.

The bandwidth of the loop, due to the stability criteria, cannot exceed the Nyquist frequency and the sample (and apply) rate of the measured quantity (e.g., the output voltage) is synchronized with the input voltage frequency and is exactly twice the input frequency as a result of the rectification. The loop bandwidth, if employing discrete-time control, is typically limited to the AC input frequency and not a small fraction of it.

Furthermore, the proposed level 2 and level 3 enhancements (nonlinear control techniques) have the effect of adding loop gain without causing instability, for example, continuous instability.

Figure 9:
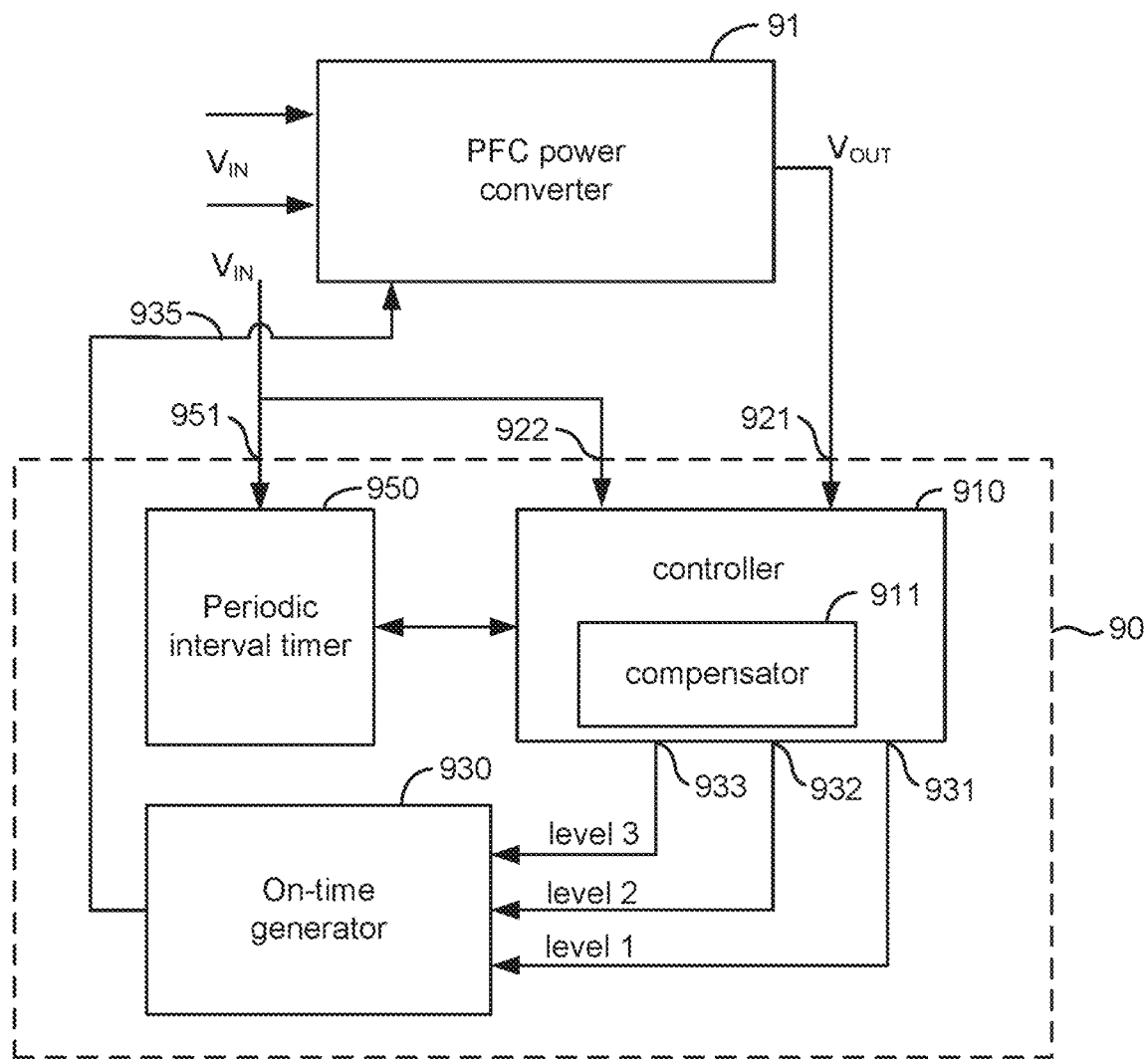
FIG. 9 is a functional block diagram illustrating a non-linear, discrete-time control structure of a PFC power converter according to an embodiment of the present disclosure.

FIG. 9 is a functional block diagram illustrating a nonlinear, discrete-time control structure 90 of a PFC power converter 91 according to an embodiment of the present disclosure. PFC power converter 91 may be a totem-pole bridgeless critical conduction mode boost power converter as shown in FIG. 5. Referring to FIG. 9, nonlinear, discrete-time control structure 90 includes a controller 910 having one or more compensators 911, an on-time generator 930, and a periodic interval timer 950. Controller 910 includes a first input 921 configured to receive an output voltage $V_{OUT}$ of the power converter 91, a second input 922 configured to receive an AC signal of a cyclically varying input signal $V_{IN}$, a first output 931 configured to provide an operation level 1 signal, a second output 932 configured to provide an operation level 2 signal, and a third output 933 configured to provide an operation level 3 signal to on-time generator 930. In one embodiment, the first operation level signal is for a small voltage perturbation on the output voltage at the zero-crossing, the second operation level signal is for a large voltage perturbation on the output voltage at the zero-crossing, and the third operation level signal is for a large perturbation on the output voltage within a half-cycle of the cyclically varying input signal Periodic interval timer 950 includes an input 951 connecting to one of the terminals of the input signal $V_{IN}$ and configured to synchronize with the input signal $V_{IN}$ and trigger controller 910 to sample the output voltage at the zero-crossing point. In one embodiment, the input signal $V_{IN}$ provided to nonlinear, discrete-time control structure 90 may be a scaled version of the AC voltage or a rectified AC voltage of the mains. Controller 910 may determine whether or not the sampled output voltage is available at the zero-crossing point of the input signal and communicate the determination result to periodic interval timer 950. According to the determination result, the periodic interval timer 950 may trigger the controller 910 to sample the output voltage at an earlier time before the zero-crossing time, as shown in operations 410 and 411 of FIG. 4. Alternatively, when controller 910 determines that the sampled output voltage is available at the zero-crossing point, controller 910 may initiate operations 403 through 408 as shown and described in relation to FIG. 4.

In one embodiment, the one or more compensators 911 may include a linear or nonlinear compensator for generating a level 1 compensator process, a 2-step nonlinear compensation process, and a nonlinear level 3 compensation process. Controller 910 may include a processor, hardware logic, a memory for storing instructions or program codes configured to perform the operations described in connection with FIG. 4. In one embodiment, on-time generator 930 receives one of the compensation processes and generates, in response to the received compensation process, a control signal 935 that is provided to PFC power converter 91 to regulate the output signal $V_{OUT}$. In one embodiment, the one or more compensators may include a level 1 compensator (a linear PID or PI compensator for small signal control), a level 2 compensator (a nonlinear, discrete-time compensator for a sudden change of a load), and a level 3 compensator (a nonlinear, discrete-time compensator for an abnormal output voltage condition). In one embodiment, the controller samples an amplitude of the output voltage at the zero crossing of the input signal and compares the sampled amplitude with a predetermined range to obtain a comparison result. Based on the comparison result and the state of a level flag (having one or more bits), the controller 910 selects one of the compensation processes to provide to the on-time generator 930, which generates a control signal to the PFC power converter 91 according to the selected compensation process.

Controller 910 may include a processing unit and a memory coupled to the processing unit and configured to store program instructions for the processing unit to control the one or more compensators and the on-time generator to control the PFC power converter by performing operations described in FIG. 4.

Although embodiments of the present disclosure have been described in detail, it should be understood that various modifications, substitutions and variations can be made hereto without departing from the scope of the invention as defined by the appended claims. In one such variation, the control signal generator may be a duty-cycle generator for controlling a fixed frequency continuous conduction mode (CCM) Power Factor Correction circuit instead of the constant on-time generator for CrCM (TCM) controller as exemplified herein. In another such variation, the PFC converter may be based on a bridge rectifier rather than being bridgeless.

What is claimed is:

1. An apparatus for controlling a power converter operable to receive a cyclically varying input signal, the apparatus comprising:
   a discrete-time, on-time generator coupled to the power converter and configured to regulate an output voltage of the power converter; and
   a controller configured to compare the output voltage of the power converter against a first predetermined range to:
      obtain a comparison result at a zero-crossing of the cyclically varying input signal; and
      select one of a plurality of operation levels of the discrete-time, on-time generator in response to the comparison result;
   wherein the plurality of operation levels comprises a first discrete-time operation level and a second discrete-time operation level.

2. The apparatus of claim 1 wherein:
   if the output voltage is within the first predetermined range, the first discrete-time operation level is selected; and
   if the output voltage is outside the first predetermined range, the second discrete-time operation level is selected.

3. The apparatus of claim 1 wherein the discrete-time, on-time generator is configured to output a plurality of constant on-time pulses within a half-cycle of the cyclically varying input signal when the controller selects the first discrete-time operation level.

4. The apparatus of claim 1 wherein the discrete-time, on-time generator is configured to output at least one adaptive on-time pulse within a half-cycle of the cyclically varying input signal adjacent to the zero-crossing of the cyclically varying input signal when the controller selects the second discrete-time operation level.

5. The apparatus of claim 1 wherein the discrete-time, on-time generator is operable to respond to a large perturbation on the output voltage of the power converter at the zero-crossing while operating at the second discrete-time operation level.

6. The apparatus of claim 1 wherein the discrete-time, on-time generator is operable to respond to a large perturbation on the output voltage of the power converter within a half-cycle of the zero-crossing while operating at a third discrete-time operation level.

7. The apparatus of claim 1 further comprising a periodic interval timer configured to cause the controller to sample the output voltage at the zero crossing of the cyclically varying input signal, wherein the controller is further configured to:
   determine a status of a flag;
   when the flag is not set, determine whether the output voltage is within the first predetermined range and select the first discrete-time operation level when the output voltage is within the first predetermined range; and
   stop the first discrete-time operation level when the controller detects a second zero crossing of the output voltage.

8. The apparatus of claim 7 wherein the controller is further configured to:

select the second discrete-time operation level when the output voltage is not within the first predetermined range;

set the flag; and stop the second discrete-time operation level when the controller detects a third zero crossing of the output voltage.

9. The apparatus of claim 7 wherein the second discrete-time operation level is configured to adjust a width of an adaptive on-time pulse of the discrete-time, on-time generator by a first predetermined amount of time in a first half-cycle of the cyclically varying input signal adjacent to the zero-crossing of the cyclically varying input signal.

10. The apparatus of claim 9 wherein the controller is further configured to:

adjust the width of the adaptive on-time pulse of the discrete-time, on-time generator in a second half-cycle immediately following the first half-cycle by a second predetermined amount of time smaller than the first predetermined amount of time; and reset the flag.

11. The apparatus of claim 1 wherein the controller is further configured to:

sample a second output voltage of the power converter at a set point that is not a zero-crossing point of the cyclically varying input signal;

determine whether the sampled second output voltage at the set point is within a second predetermined range greater than the first predetermined range;

when the sampled second output voltage is within the second predetermined range, repeat the step of sampling the second output voltage; and when the sampled second output voltage is not within the second predetermined range, increase a width of a variable on-time pulse of the discrete-time, on-time generator to a maximum value for a remaining half-cycle of the cyclically varying input signal.

12. The apparatus of claim 1 wherein the first discrete-time operation level comprises a critical conduction mode control having constant on-time control signals, and the second discrete-time operation level comprises at least one change of input power in a cycle of the cyclically varying input signal.

13. The apparatus of claim 12 wherein the second discrete-time operation level returns back to the first discrete-time operation level after the at least one change of input power.

14. A method for controlling a power factor of a power converter, the method comprising:

obtaining an output voltage of the power converter at a zero-crossing of a cyclically varying input signal, the output voltage being regulated by an on-time generator;

comparing, by a controller, the output voltage against a first predetermined range to obtain a comparison result; and selecting, by the controller, one of a plurality of operation levels of the on-time generator in response to the comparison result, the plurality of operation levels comprising a first discrete-time operation level and a second discrete-time operation level.

15. The method of claim 14 wherein:

comparing the output voltage against the first predetermined range comprises determining whether the output voltage is within the first predetermined range; and selecting one of the plurality of operation levels comprises:

selecting the first discrete-time operation level when the output voltage is within the first predetermined range; and selecting the second discrete-time operation level when the output voltage is not within the first predetermined range.

16. The method of claim 14 wherein the on-time generator is configured to output a plurality of constant on-time pulses within a half-cycle of the cyclically varying input signal when the controller selects the first discrete-time operation level and at least one adaptive on-time pulse within a half-cycle of the cyclically varying input signal adjacent to the zero-crossing of the cyclically varying input signal when the controller selects the second discrete-time operation level.

17. The method of claim 14 wherein the plurality of operation levels further comprises a third discrete-time operation level and selecting one of the plurality of operation levels comprises:

selecting the second discrete-time operation level in response to a large perturbation on the output voltage of the power converter at the zero-crossing; and selecting the third discrete-time operation level in response to a large perturbation on output voltage of the power converter within a half-cycle of the zero-crossing.

18. The method of claim 14 further comprising:

determining a status of a flag:

when the flag is not set, determining whether the output voltage is within the first predetermined range;

selecting the first discrete-time operation level when the output voltage is within the first predetermined range; and stopping the first discrete-time operation level when detecting a second zero crossing of the output voltage.

19. The method of claim 14 further comprising:

sampling a second output voltage of the power converter at a set point that is not a zero-crossing point of the cyclically varying input signal;

determining whether the sampled second output voltage at the set point is within a second predetermined range greater than the first predetermined range;

when the sampled second output voltage is within the second predetermined range, repeating the step sampling the second output voltage; and when the sampled second output voltage is not within the second predetermined range, increasing a width of a variable on-time pulse of the on-time generator to a maximum value for a remaining half-cycle of the cyclically varying input signal.

20. The method of claim 14 wherein the on-time generator is configured to generate a plurality of signals having a constant on-time interval and a variable off-time interval.

* * * * *